US009525993B2

United States Patent
Wei et al.

(10) Patent No.: US 9,525,993 B2
(45) Date of Patent: Dec. 20, 2016

(54) UNIFIED HEADER DESIGN FOR DISCOVERY MESSAGES

(71) Applicant: Sony Corporation, Tokyo (JP)

(72) Inventors: Na Wei, Beijing (CN); Anders Berggren, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 143 days.

(21) Appl. No.: 14/453,223

(22) Filed: Aug. 6, 2014

(65) Prior Publication Data

US 2015/0281938 A1 Oct. 1, 2015

Related U.S. Application Data

(63) Continuation of application No. PCT/CN2014/074509, filed on Apr. 1, 2014.

(51) Int. Cl.
*H04W 40/24* (2009.01)
*H04W 8/00* (2009.01)
*H04W 4/00* (2009.01)

(52) U.S. Cl.
CPC .............. *H04W 8/005* (2013.01); *H04W 4/005* (2013.01)

(58) Field of Classification Search
CPC ............... H04W 8/005; H04W 40/246; H04W 72/1242; H04L 29/08396; H04L 29/08423; H04L 29/08432
See application file for complete search history.

(56) References Cited

U.S. PATENT DOCUMENTS

| 2009/0129326 A1* | 5/2009 | Kim | H04L 47/10 370/329 |
| 2010/0111106 A1* | 5/2010 | Norris | H04W 28/06 370/469 |
| 2014/0056220 A1* | 2/2014 | Poitau | H04W 40/246 370/328 |
| 2014/0064487 A1* | 3/2014 | Abraham | H04L 63/045 380/270 |

(Continued)

FOREIGN PATENT DOCUMENTS

CN 101822021 A 9/2010

OTHER PUBLICATIONS

Huawei et al. D2D discovery message design; 3GPP TSG RAN WG1 Meeting #76 R1-140055 Feb. 14, 2014.

(Continued)

*Primary Examiner* — Scott M Sciacca
(74) *Attorney, Agent, or Firm* — James C. Edwards; Moore & Van Allen PLLC

(57) ABSTRACT

Embodiments are directed to systems, methods and computer program products for enhancing proximity service (ProSe) device to device (D2D) discovery. Embodiments build a discovery message configured for communication over the MAC sub-layer; wherein the discovery message comprises a unified header comprising at least one of a priority level indicator for indicating a priority level of the discovery message; a security existence indicator for indicating whether the discovery message is at least partially encrypted; a type indicator for indicating a discovery message type; and/or an SDU presence indicator (S_ind) for indicating whether the discovery message includes an SDU.

15 Claims, 5 Drawing Sheets

(56) References Cited

U.S. PATENT DOCUMENTS

| | | | | |
|---|---|---|---|---|
| 2014/0082205 A1* | 3/2014 | Abraham | ............ | H04L 65/1069 709/227 |
| 2014/0242963 A1* | 8/2014 | Novlan | ................ | H04W 48/16 455/418 |
| 2015/0195863 A1* | 7/2015 | Reznik | ................ | H04W 76/027 370/228 |
| 2015/0289312 A1* | 10/2015 | Ranta | ................ | H04W 76/043 370/328 |
| 2015/0319595 A1* | 11/2015 | Hakola | ................ | H04W 8/005 370/254 |

OTHER PUBLICATIONS

3rd Generation Partnership Project; Technical Specification Group Services and System Aspects; Study on architecture enhancements to support Proximity-based Services (ProSe) (Release 12) 3GPP TR 23.703 V12.0.0 Feb. 28, 2014.

International Search Report and Written Opinion; Jan. 6, 2015; issued in International Patent Application No. PCT/CN2014/074509.

* cited by examiner

200

BUILDING A DISCOVERY MESSAGE CONFIGURED FOR COMMUNICATION OVER THE MAC SUB-LAYER OF THE DATA LINK LAYER OF A COMPUTER NETWORKING MODEL
210

INCLUDING A UNIFIED HEADER IN THE DISCOVERY MESSAGE INCLUDING A PRIORITY LEVEL INDICATOR FOR INDICATING A PRIORITY LEVEL OF THE DISCOVERY MESSAGE
220

INCLUDING A UNIFIED HEADER IN THE DISCOVERY MESSAGE INCLUDING A SECURITY EXISTENCE INDICATOR FOR INDICATING THE DISCOVERY MESSAGE IS AT LEAST PARTIALLY ENCRYPTED
230

INCLUDING A UNIFIED HEADER IN THE DISCOVERY MESSAGE INCLUDING A TYPE INDICATOR FOR INDICATING A DISCOVERY MESSAGE TYPE
240

INCLUDING A UNIFIED HEADER IN THE DISCOVERY MESSAGE INCLUDING AN SDU PRESENCE INDICATOR (S_ind) FOR INDICATING WHETHER THE DISCOVERY MESSAGE INCLUDES AN SDU
250

Figure 2

UNIFIED HEADER DESIGN FOR DISCOVERY MESSAGES

BACKGROUND

The Third Generation Partnership Project (3GPP) radio access network (RAN) collaboration has addressed device to device (D2D) proximity services (ProSe) or proximity based applications. A core component of proximity services is discovery of user equipment (UE), also referred to as user devices, apparatuses and the like. ProSe discovery may involve two or more UEs in proximity to one another. Identified use cases for proximity-based services include public safety and non-public safety scenarios.

BRIEF SUMMARY

Embodiments of the invention are directed to systems, methods and computer program products for enhancing proximity service (ProSe) device to device (D2D) discovery over a data communication protocol data link layer or sub-layer of a computer networking model. A method comprises building, by a user device, a discovery message configured for communication over the data link layer or sub-layer; wherein the discovery message comprises a unified header comprising at least one of a priority level indicator for indicating a priority level of the discovery message; a security existence indicator for indicating whether the discovery message is at least partially encrypted; a type indicator for indicating a discovery message type; or an SDU presence indicator (S_ind) for indicating whether the discovery message includes an SDU.

In some embodiments, a group of D2D user devices comprises the user device and the group of D2D user devices has established at least one D2D communication link using at least one broadcast channel or at least one unicast channel.

In some embodiments, the discovery message comprises a unified header comprising a priority level indicator for indicating a priority level of the discovery message; wherein the priority level indicator is disposed in one or more reserved bits in an LCID byte. In some embodiments, the discovery message comprises a unified header comprising a priority level indicator for indicating a priority level of the discovery message; and wherein the priority level indicator is disposed in one or more reserved bits in the unified header other than an LCID byte. In some embodiments, the discovery message comprises a unified header comprising a priority level indicator for indicating a priority level of the discovery message; and wherein the priority level indicator is represented by an LCID byte. In some embodiments, the discovery message comprises a unified header comprising a priority level indicator for indicating a priority level of the discovery message; wherein the priority level indicator is for indicating one of a plurality of discovery message priority levels; the method includes prioritizing, by the user device, the discovery message among a plurality of discovery messages based at least in part on the priority level indicator.

In some embodiments, the discovery message comprises a unified header comprising a security existence indicator for indicating whether the discovery message is at least partially encrypted. In some such embodiments, the unified header further comprises information related to a security method applied to the discovery message, information related to security options or information related to a key sequence index for a MAC service data unit (SDU). In other such embodiments, the security existence indicator is disposed in one or more reserved bits in an LCID byte of the unified header. In other such embodiments, the security existence indicator is disposed in one or more reserved bits in the unified header other than those in an LCID byte of the unified header.

In some embodiments, the discovery message comprises a unified header comprising a type indicator for indicating a discovery message type, and the method further comprises determining, by the user device, a MAC SDU length based at least in part on the discovery message type. In some such embodiments, the unified header does not include an SDU length byte; and wherein determining the MAC SDU length is based on the discovery message type.

In other such embodiments, determining the MAC SDU length comprises accessing a length mapping table; determining a table MAC SDU length associated with the discovery message type indicated by the type indicator; and determining the MAC SDU length based on the table MAC SDU length.

In some embodiments, the discovery message comprises a unified header comprising SDU presence indicator (S_ind) for indicating whether the discovery message includes a MAC SDU.

In some embodiments, the method is for enhancing proximity service (ProSe) device to device (D2D) discovery over a media access control (MAC) sub-layer of a data link layer of a computer networking model, where building the discovery message comprises building the discovery message configured for communication over the MAC sub-layer.

According to embodiments of the invention, a user device includes a memory; a processor; and a module stored in the memory, executable by the processor, and configured to build a discovery message configured for communication over the MAC sub-layer; wherein the discovery message comprises a unified header comprising at least one of a priority level indicator for indicating a priority level of the discovery message; a security existence indicator for indicating whether the discovery message is at least partially encrypted; a type indicator for indicating a discovery message type; or an SDU presence indicator (S_ind) for indicating whether the discovery message includes an SDU.

According to embodiments of the invention, a computer program product includes a non-transitory computer-readable medium comprising a set of codes for causing a computer to build a discovery message configured for communication over the MAC sub-layer; wherein the discovery message comprises a unified header comprising at least one of a priority level indicator for indicating a priority level of the discovery message; a security existence indicator for indicating whether the discovery message is at least partially encrypted; a type indicator for indicating a discovery message type; or an SDU presence indicator (S_ind) for indicating whether the discovery message includes an SDU.

BRIEF DESCRIPTION OF THE DRAWINGS

Figure 1:
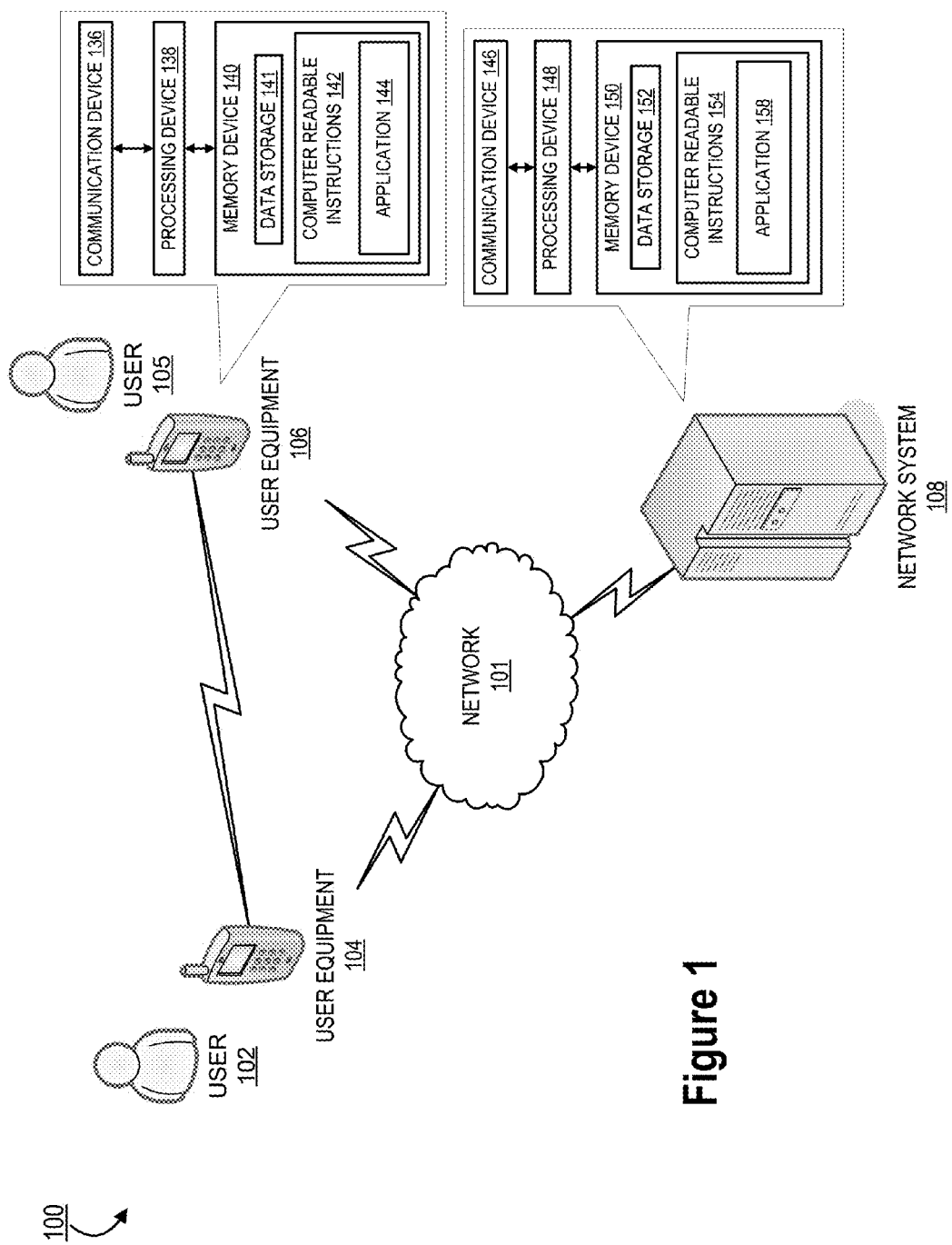
Figure 3A:
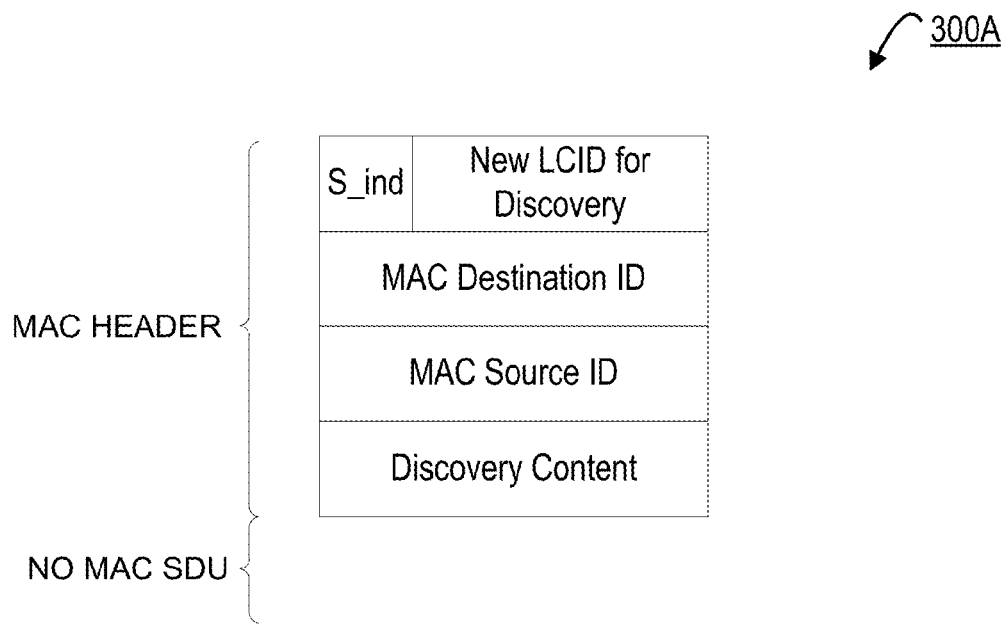
Figure 3B:
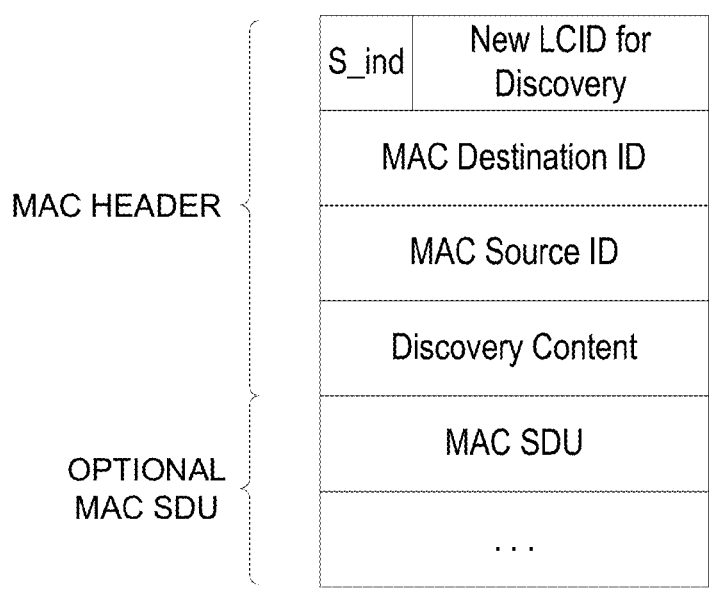
Figure 4A:
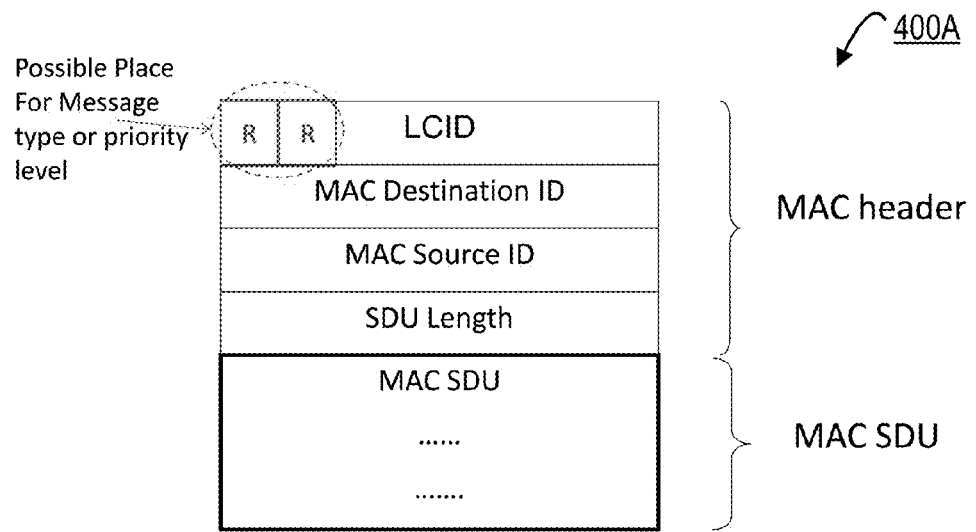
Figure 4B:
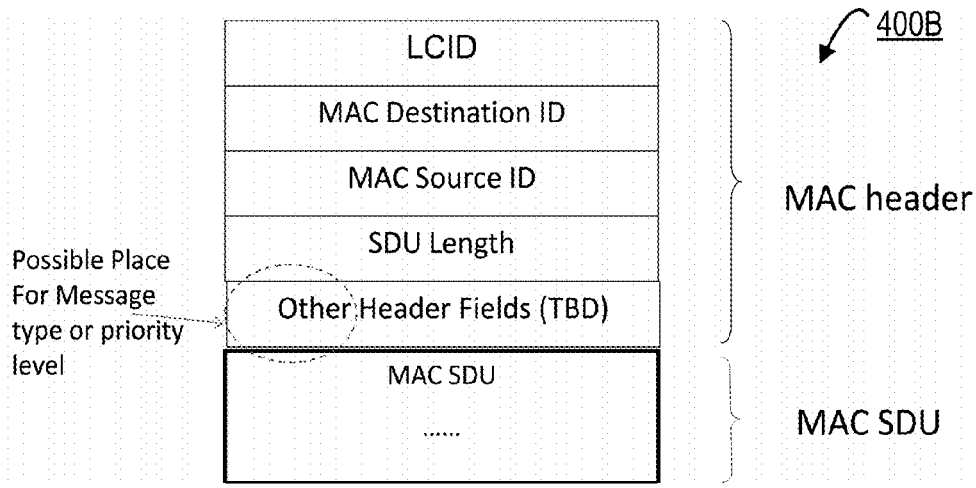
Figure 5A:
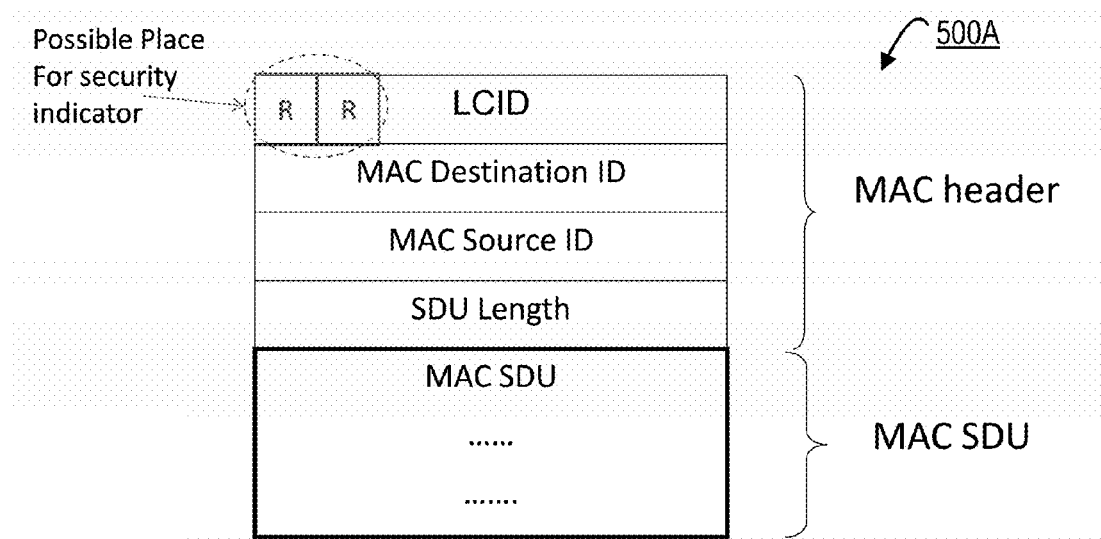
Figure 5B:
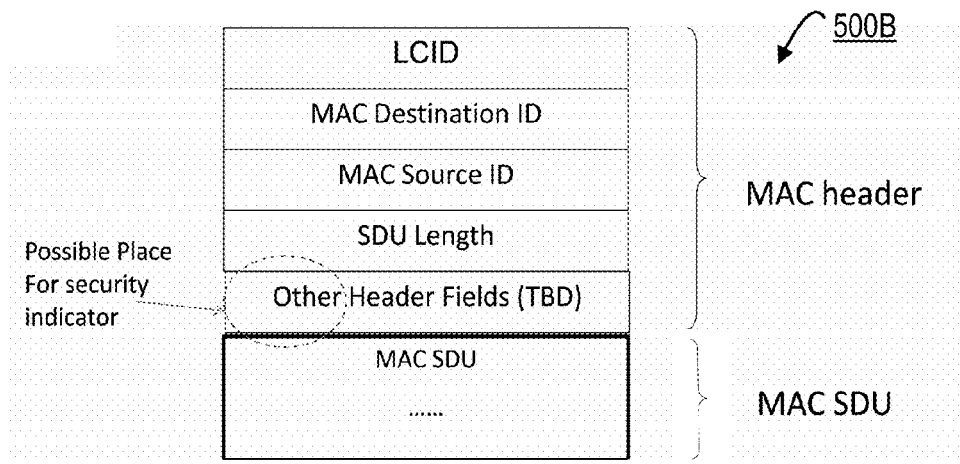

Having thus described embodiments of the invention in general terms, reference will now be made to the accompanying drawings, where:

FIG. 1 illustrates an environment wherein user equipment devices and network systems operate according to embodiments of the invention;

FIG. 2 illustrates a flowchart of a method 200 for enhancing ProSe device to device discovery according to embodiments of the invention;

FIGS. 3A and 3B illustrate proposed flexible MAC PDU formats having a unified MAC header with a presence indicator S_ind and an LCID for discovery according to embodiments of the invention;

FIGS. 4A and 4B illustrate proposed MAC PDU formats having a unified MAC header with a priority level indicator according to embodiments of the invention; and FIGS. 5A and 5B illustrate proposed MAC PDU formats having a unified MAC header with a security existence indicator according to embodiments of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Discovery signaling messages may be carried within a second layer frame payload such as a Targeted Discovery Request, Targeted Discovery Response, Targeted Discovery Ack, Non-targeted Discovery Request, Non-targeted Discovery Response and Beacon. Potential options for discovery messaging are very large and accommodating them all with a single header may prove impossible. Because compact message size is critical for good performance in delay and transmission range, the message header design should compress the message as much as possible.

In one proposed MAC PDU format, the MAC header would include an LCID, a MAC Destination ID, a MAC Source ID and an SDU Length. The MAC SDU would follow the MAC header. It has been discussed that to distinguish different payload types easily and to forward them to the correct protocol layer, a payload type indicator may be included in the MAC header similar to the LCID in the LTE MAC header. Doing so may enable the UE to decide how to process the payload in the MAC layer, that is, without the need to decrypt the payload. Doing so will save processing efforts and conserve battery power.

In the proposal, the payload type "control" is used to indicate message intended for control of radio resources. The contained information is intended for Layer-2 Protocol Layers. The payload type "signaling" indicates packets that contain higher layer signaling information and have to be passed to the C-Plane of higher layers, for example, for authentication purposes. The payload type "data" is also intended for the higher layers other than the U-Plane.

However, the current MAC solution does not account for various discovery types and cannot fulfill some D2D specific new needs. Also, PDCP design may be necessary to meet certain security standards for some discovery message, while not necessary for some other discovery message. Finally, the protocol and procedure design for such methods is still under discussion.

Accordingly, embodiments of the invention involve building a unified (i.e., standardized) header for a discovery message over the media access control (MAC) sub-layer of the data link layer. The data link layer is the second layer of the network model (e.g., the OSI Model), where the physical layer is the first, lowest layer of the network model. The unified MAC header may include a length indicator for indicating a length of the discovery message, a security indicator for indicating the discovery message contains encryption, one or more security options, or a key sequence index for a MAC service data unit (SDU), or a type indicator for indicating a discovery message type or priority level. The advantage of this proposal is to standardize a MAC discovery message header that may provide for compact message length and also accommodate security checking, target service/group/application discovery or otherwise.

Referring now to FIG. 1, a network environment 100 is illustrated in accordance with one embodiment of the present invention. As illustrated in FIG. 1, the network system 108 is operatively coupled, via a network 101 to the user equipment 104 and/or 106. In this configuration, the network system 108 may send information to and receive information from the user equipment devices 104 and/or 106. FIG. 1 illustrates only one example of an embodiment of a network environment 100, and it will be appreciated that in other embodiments one or more of the systems, devices, or servers may be combined into a single system, device, or server, or be made up of multiple systems, devices, or servers.

The network 101 may be a global area network (GAN), such as the Internet, a wide area network (WAN), a local area network (LAN), a telecommunication network or any other type of network or combination of networks. The network 101 may provide for wireline, wireless, or a combination wireline and wireless communication between devices on the network 101. In some embodiments, the users 102 and 105 are individuals who maintain cellular products with one or more providers.

As illustrated in FIG. 1, the network system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 148 is operatively coupled to the communication device 146 and the memory device 150. The processing device 148 uses the communication device 146 to communicate with the network 101 and other devices on the network 101. As such, the communication device 146 generally comprises a modem, server, or other device for communicating with other devices on the network 101.

As further illustrated in FIG. 1, the network system 108 comprises computer-readable instructions 154 stored in the memory device 150, which in one embodiment includes the computer-readable instructions 154 of an application 158. In some embodiments, the memory device 150 includes data storage 152 for storing data related to and/or used by the application 158.

In some embodiments, the application 158 may allow for communications between the UEs 104 and 106 with or without assistance from the network 101.

As illustrated in FIG. 2, the user equipment 106 generally comprises a communication device 136, a processing device 138, and a memory device 140. The processing device 138 is operatively coupled to the communication device 136 and the memory device 140. In some embodiments, the processing device 138 may send or receive data from the user equipment 104, and/or the network system 108 via the communication device 136 over a network 101. As such, the communication device 136 generally comprises a modem, server, or other device for communicating with other devices on the network 101.

As further illustrated in FIG. 2, the user equipment 106 comprises computer-readable instructions 142 stored in the memory device 140, which in one embodiment includes the computer-readable instructions 142 of an application 144. In the embodiment illustrated in FIG. 2, the application 144 allows the user equipment 106 to be linked to the network system 108 to communicate, via a network 101. The application 144 may also allow the user equipment 106 to connect directly (i.e., locally or device to device) with the user equipment 104 for proximity services (e.g., using either cellular based links or non-cellular based links).

It is understood that the servers, systems, and devices described herein illustrate one embodiment of the invention. It is further understood that one or more of the servers, systems, and devices can be combined in other embodiments and still function in the same or similar way as the embodiments described herein.

As discussed above, a unified MAC header can provide flexibility such as variable lengths for different message types and also provides better performance. For example, if the unified MAC header is designed with more compact size, discovery can be completed faster and more reliably. Also, transmission range can be increased.

Referring now to FIG. 2, a flowchart illustrates a method 200 for enhancing ProSe device to device discovery according to embodiments of the invention. The first step of method 200, as represented by block 210, is building a discovery message configured for communication over the MAC sub-layer of the data link layer of a computer networking model (e.g., the OSI Model). The discovery message includes a unified header.

The unified header, as represented by block 220, may include a priority level indicator for indicating a priority level of the discovery message. The priority level indicator may use reserved bits in an LCID byte (as shown in FIG. 5A) or be contained in another byte of the discovery header (as shown in FIG. 5B). The MAC layer can impose different levels of priority on different messages, and prioritize the messages based on the priority level of the type indicator. Then, the MAC layer may process the PDU according to different QoS handling, such as priority handling, or assign different logical channels with different prioritization. For example, a type indicator of "00" indicates beacon, a type indicator of "01" indicates a discovery request, a type indicator of "10" indicates a discovery response, and a type indicator of "11" indicates a target discovery ACK. The levels may be prioritized as: data packet and other signaling=level 0, beacon=level 1, discovery request/response=level 2, and discovery ACK=level 3.

In some embodiments, if there is no message type indicated in a header (e.g., if there are too many possible message types available), then a priority indicator may be used instead of message type. Thus, the MAC layer can treat same priority level messages with the same QoS requirements.

In some cases, the unified header may include a security existence indicator for indicating the discovery message is at least partially encrypted, as represented by block 230. Additionally, the header may contain more security related information. For example, the header may include information related to the security method applied, information related to security options and/or information related to a key sequence index for a MAC SDU. As a specific example, a "0" security existence indicator may indicate that no AS security is applied, whereas a "1" security existence indicator may indicate that AS security is applied. The security existence indicator and/or other security related information may be placed in bits of the LCID (as shown in FIG. 6A) or may be placed in other header fields (as shown in FIG. 6B).

In some cases, the unified header may include a type indicator for indicating a discovery message type, as represented by block 240. In some embodiments, the MAC SDU length may be implicitly determined by the discovery message type. For such DTC messages, the SDU length bytes are removed. As one example, a discovery message type of "00" indicates beacon or target discovery ACK (SDU length=2^4=16 bits), a type of "01" indicates non-target discovery request/response (SDU length=2^8=256 bits), a type of "10" indicates target discovery request/response (SDU length=2^10=1034 bits) and a type of "11" indicates public safety open discovery of relays (SDU length=2^12=4096 bits).

In some embodiments, due to the large variation of possible message length for DTC, different length mapping tables may be defined for different message types. The UE may determine the appropriate table or portion/entry of a table to access based on the message type. For example, for some network-based interpretations of broadcast ProSe discovery messages containing a ProSe_Code, message size can be below 256 bits. The mapping table can be defined in the range of [0-256] and use eight (8) bits on length indication. As another example, for basic UE-to-network relay advertisement may be about 400 to 900 bits long. Adding security can increase the size by 1024 bits. Then, the mapping table may be defined in a range of 10 bits.

In some cases, the discovery MAC PDU can optionally be used with or without a MAC SDU. The unified header may include an SDU presence indicator (e.g., "S_ind"), as represented by block 250. This enables an extremely compact format, and in some cases, can result in delay and/or transmission range performance similar to physical layer methods.

In some embodiments, the SDU presence indicator (S_ind) may be part of the length indicator, or, in some cases, the length indicator replaces the need for the presence indicator because a length indicator of a specific length may indicate there is no SDU.

Referring now to FIGS. 3A and 3B, a proposed flexible MAC PDU format is shown having a unified MAC header with a presence indicator S_ind and an LCID for discovery according to embodiments of the invention. FIG. 3A illustrates a message having no MAC SDU. FIG. 3B illustrates a message having a MAC SDU.

Referring now to FIGS. 4A and 4B, the priority level indicator may be included in the LCID (as shown in 400A) or other header fields (as shown in 400B) of the MAC header. In some embodiments, different LCID values are mapped to differentiate the priority level within D2D communications as shown in the example of TABLE 1 below.

TABLE 1

| Level | Index | LCID values |
|---|---|---|
| 0 | LCID value 1 (e.g., 00001) | data |
| 1 | LCID value 2 (e.g., 00010) | beacon |
| 2 | LCID value 3 (e.g., 00011) | Discovery request/response |
| 3 | LCID value 4 (e.g., 00100) | Discovery ACK |

Referring now to FIGS. 5A and 5B, the security existence indicator may be included in the LCID (as shown in 500A) or other header fields (as shown in 500B) of the MAC header.

Accordingly, an L2 discovery message can have a unified MAC header design that can accommodate various discovery message requirements. The discovery message can be a very compact length for delay critical signaling. In addition, the unified header enables flexibility for discovery having higher security checking requirements or target service/group/application discovery. Finally, the unified header provides a more predictable transmission range and/or performance with limited options for SDU length selection.

In general, multiple UEs (more than two) may be involved in proximate services discovery. For example, the sending UE may send one or more discovery messages to multiple proximate UEs, which in turn may send multiple response messages to the sending UE. In some cases, there are one or more groups of UEs that operate in a collaborative fashion such that they are linked collectively to one or more other UEs, either individually and/or as a group.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for enhancing proximity service (ProSe) device to device (D2D) discovery over a data communication protocol data link layer or sub-layer of a computer networking model, the method comprising:
   building, by a user device, a discovery message configured for communication over the data communication protocol data link layer or sub-layer;
   wherein the discovery message comprises a unified header comprising:
      a security existence indicator for indicating whether the discovery message is at least partially encrypted, wherein the security existence indicator is disposed in one or more reserved bits in an LCID (logical channel identifier) byte of the unified header; and
   at least of:
      a priority level indicator for indicating a priority level of the discovery message, wherein the priority level defines the quality of service (QoS) level for processing the discovery message; and
      a type indicator for indicating a discovery message type.

2. The method of claim 1, wherein a group of D2D user devices comprises the user device and the group of D2D user devices has established at least one D2D communication link using at least one broadcast channel or at least one unicast channel.

3. The method of claim 1, wherein the discovery message comprises the unified header comprising the priority level indicator for indicating a priority level of the discovery message;
   wherein the priority level indicator is disposed in one or more reserved bits in an LCID (logical channel identifier) byte.

4. The method of claim 1, wherein the discovery message comprises the unified header comprising the priority level indicator for indicating a priority level of the discovery message;
   wherein the priority level indicator is disposed in one or more reserved bits in the unified header other than an LCID (logical channel identifier) byte.

5. The method of claim 1, wherein the discovery message comprises the unified header comprising the priority level indicator for indicating a priority level of the discovery message;
   wherein the priority level indicator is represented by an LCID (logical channel identifier) byte.

6. The method of claim 1, wherein the discovery message comprises a unified header comprising the priority level indicator for indicating the priority level of the discovery message;
   wherein the priority level indicator is for indicating one of a plurality of discovery message priority levels; the method further comprising:
   prioritizing, by the user device, the discovery message among a plurality of discovery messages based at least in part on the priority level indicator.

7. The method of claim 1, wherein the unified header further comprises one of (i) information related to a security method applied to the discovery message, (ii) information related to security options or (iii) information related to a key sequence index for a MAC (media access control) service data unit (SDU).

8. The method of claim 1, wherein the security existence indicator is disposed in one or more reserved bits in the unified header other than those in an LCID (logical channel identifier) byte of the unified header.

9. The method of claim 1, wherein the discovery message comprises the unified header comprising the type indicator for indicating a discovery message type, the method further comprising:
   determining, by the user device, a MAC (media access control) SDU (service data unit) length based at least in part on the discovery message type.

10. The method of claim 9, wherein the unified header does not include an SDU length byte; and wherein determining the MAC SDU length is based on the discovery message type.

11. The method of claim 9, wherein determining the MAC SDU length comprises:
    accessing a length mapping table;
    determining a table MAC SDU length associated with the discovery message type indicated by the type indicator; and
    determining the MAC SDU length based on the table MAC SDU length.

12. The method of claim 1, wherein the discovery message comprises the unified header further comprising SDU (service data unit) presence indicator (S_ind) for indicating whether the discovery message includes a MAC (media access control) SDU.

13. The method of claim 1, wherein the method is for enhancing proximity service (ProSe) device to device (D2D) discovery over a media access control (MAC) sub-layer of a data link layer of a computer networking model, wherein building the discovery message comprises building the discovery message configured for communication over the MAC sub-layer.

14. A user device for enhancing proximity service (ProSe) device to device (D2D) discovery, the apparatus comprising:
    a memory;
    a processor; and
    a module stored in the memory, executable by the processor, and configured to:
       build a discovery message configured for communication over the MAC (media access control) sublayer;
    wherein the discovery message comprises a unified header comprising:
       a security existence indicator for indicating whether the discovery message is at least partially encrypted, wherein the security existence indicator is disposed in one or more reserved bits in an LCID (logical channel identifier) byte of the unified header; and at least one of:
- a priority level indicator for indicating a priority level of the discovery message, wherein the priority level defines the quality of service (QoS) level for processing the discovery message; and
- a type indicator for indicating a discovery message type.

15. A computer program product for enhancing proximity service (ProSe) device to device (D2D) discovery, the computer program product comprising:
- a non-transitory computer-readable medium comprising a set of codes for causing a computer to:
  build a discovery message configured for communication over the MAC (media access control) sublayer;
- wherein the discovery message comprises a unified header comprising:
  - a security existence indicator for indicating whether the discovery message is at least partially encrypted, wherein the security existence indicator is disposed in one or more reserved bits in an LCID (logical channel identifier) byte of the unified header; and
  - at least one of:
  - a priority level indicator for indicating a priority level of the discovery message, wherein the priority level defines the quality of service (QoS) level for processing the discovery message; and
- a type indicator for indicating a discovery message type.

* * * * *